US012060984B2

(12) United States Patent
Lu et al.

(10) Patent No.: US 12,060,984 B2
(45) Date of Patent: Aug. 13, 2024

(54) LINEAR LIGHT HAVING CLAMPER

(71) Applicant: Xiamen PVTECH Co., Ltd., Fujian (CN)

(72) Inventors: Fuxing Lu, Fujian (CN); Sishan Liao, Fujian (CN)

(73) Assignee: Xiamen PVTECH Co., Ltd., Fujian (CN)

( * ) Notice: Subject to any disclaimer, the term of this patent is extended or adjusted under 35 U.S.C. 154(b) by 0 days.

(21) Appl. No.: 18/216,569

(22) Filed: Jun. 29, 2023

(65) Prior Publication Data

US 2024/0240778 A1 Jul. 18, 2024

(30) Foreign Application Priority Data

Jan. 16, 2023 (CN) ........................ 202310067783.4

(51) Int. Cl.
*F21V 21/088* (2006.01)
*F21S 8/06* (2006.01)
*F21Y 103/20* (2016.01)

(52) U.S. Cl.
CPC ............ *F21V 21/088* (2013.01); *F21S 8/063* (2013.01); *F21Y 2103/20* (2016.08)

(58) Field of Classification Search
CPC ...... F21Y 2103/20; F21S 8/063; F21V 21/088
See application file for complete search history.

(56) References Cited

U.S. PATENT DOCUMENTS

| | | | | |
|---|---|---|---|---|
| 9,976,730 B1 * | 5/2018 | Deng | F21V 23/06 | |
| 10,585,229 B1 * | 3/2020 | Lax | F21V 31/005 | |
| 11,927,325 B1 * | 3/2024 | Lu | F21V 17/164 | |
| 2012/0162982 A1 * | 6/2012 | Wang | F21V 31/005 | 362/249.02 |
| 2016/0017604 A1 * | 1/2016 | White | F21S 8/026 | 52/28 |
| 2016/0356460 A1 * | 12/2016 | Lu | F21V 23/06 | |
| 2021/0199277 A1 * | 7/2021 | Lu | F21V 27/02 | |
| 2023/0213156 A1 * | 7/2023 | Boulanger | F21S 8/061 | 362/249.02 |

* cited by examiner

*Primary Examiner* — Leah Simone Macchiarolo
(74) *Attorney, Agent, or Firm* — Winston Hsu

(57) ABSTRACT

A linear light having clamper includes a lamp body and a clamper. The lamp body has an installation groove and a protrusion portion disposed adjacent to the installation groove. The clamper has a top portion and a plurality of lateral arms disposed at the two sides of the top portion respectively. The first end portion of each of the lateral arms is provided with a load-bearing bending plate and the load-bearing bending plates are movably disposed in the installation groove and engaged with the protrusion portion. Via the above structure, the clamper can be easily installed on the lamp body and the position thereof can be freely adjusted. Besides, the linear light with the structure can further provide the self-locking function.

9 Claims, 14 Drawing Sheets

LINEAR LIGHT HAVING CLAMPER

BACKGROUND OF THE INVENTION

1. Field of the Invention

The present invention relates to a linear light, in particular to a linear light having clamper.

2. Description of the Prior Art

There are two types of clampers for currently available linear lights. Type 1: the clamper is tightly matched with the linear light and cannot slide after the clamper is installed on the linear light. Type 2: the clamper is loosely matched with the linear light and can freely move on the linear light after the clamper is installed on the linear light, and needs to be fixed through other components when necessary. These two types of clampers have their own shortcomings. Regarding Type 1, it is very difficult to install and remove the clamper, and sometimes the user needs to a tool (such as a screwdriver) to remove the clamper. Besides, it is hard to adjust the position of the clamper after the clamper is installed on the linear light. If it is necessary to adjust the position of the clamper, the user should remove the clamper and then reinstall the clamper. Forcibly adjusting the position of the clamper may scratch the linear light. Regarding Type 2, the installation of the linear light is not stable and is prone to shaking. In addition, the linear light tends to slide after installation, and may even cause it to fall. Moreover, it may need other components to achieve reliable installation of the linear light.

SUMMARY OF THE INVENTION

Therefore, it is a primary objective of the present invention to provide a linear light having a clamper; the clamper is easily to install and the position thereof can be freely adjusted. Besides, the linear light can further provide a self-locking function.

To achieve the foregoing objective, the present invention provides a linear light, which includes a lamp body and a clamper. The lamp body has an installation groove and a protrusion portion disposed adjacent to the installation groove. The clamper has a top portion and a plurality of lateral arms disposed at the two sides of the top portion respectively. The first end portion of each of the lateral arms is provided with a load-bearing bending plate and the load-bearing bending plates are movably disposed in the installation groove and engaged with the protrusion portion.

In one embodiment, the bending direction of one of the load-bearing bending plates faces the bending direction of another of the load-bearing bending plates or the bending direction of one of the load-bearing bending plates is opposite to the bending direction of another of the load-bearing bending plates. Each of the load-bearing bending plates is a protrusion structure vertical to the lateral arm corresponding thereto.

In one embodiment, the distance between the protrusion structures is greater than the width of the installation groove.

In one embodiment, the clamper is made of a plastic material or a metal material.

In one embodiment, the clamper has an installation hole disposed on the top portion thereof.

In one embodiment, the clamper has a plurality of self-locking elements disposed on the lateral arms respectively. The second end portion of each of the self-locking elements is provided with a self-locking folded portion movably engaged with the protrusion portion or disposed in the installation groove.

To achieve the foregoing objective, the present invention further provides a linear light, which includes a lamp body and a clamper. The lamp body has a protrusion stage and installation grooves disposed at the two sides of the protrusion stage respectively. The clamper has a top portion, a plurality of lateral arms disposed at two sides of the top portion respectively, and a plurality of self-locking elements. The first end portion of each of the lateral arms is provided with a load-bearing bending plate and the load-bearing bending plate are movably disposed in the installation grooves respectively. The self-locking elements are disposed on the lateral arms respectively and the second end portion of each of the self-locking elements is provided with a self-locking folded portion movably engaged with the surface of the protrusion stage.

In one embodiment, each of the self-locking elements is provided with a pressing portion and the distance between the pressing portions is greater than a distance between the lateral arms.

To achieve the foregoing objective, the present invention further provides a linear light, which includes a lamp body and a clamper. The lamp body has a plurality of installation grooves. The clamper has a top portion, a plurality of lateral arms disposed at two sides of the top portion respectively, and a plurality of self-locking elements. The first end portion of each of the lateral arms is provided with a load-bearing bending plate and the load-bearing bending plate is movably disposed in the installation groove. The self-locking elements are disposed on the lateral arms respectively and the second end portion of each of the self-locking elements is provided with a self-locking folded portion, and the self-locking folded portions engaged with the installation grooves respectively.

In one embodiment, each of the self-locking elements is provided with a pressing portion and the distance between the pressing portions is greater than the distance between the lateral arms.

To sum up, according to the linear light of one embodiment of the present invention, the clamper can be easily installed on the linear light and the user can easily and freely to move the clamper in order to adjust the position of the clamper and realize the self-locking function. When the installation of the linear light is influenced by the installation hole or a barrier (e.g., a crossbeam), the free position adjustment function of the clamper can make the installation of the linear light be easier. In addition, the self-locking function of the clamper can increase the reliability of the linear light after the installation of the linear light is finished.

Further scope of applicability of the present application will become more apparent from the detailed description given hereinafter. However, it should be understood that the detailed description and specific examples, while indicating exemplary embodiments of the present invention, are given by way of illustration only, since various changes and modifications within the spirit and scope of the present invention will become apparent to those skilled in the art from this detailed description.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The present invention will become more fully understood from the detailed description given herein below and the accompanying drawings which are given by way of illustration only, and thus are not limitative of the present invention and wherein.

DETAILED DESCRIPTION

The technical content of the present invention will become apparent by the detailed description of the following embodiments and the illustration of related drawings as follows.

Figure 1:
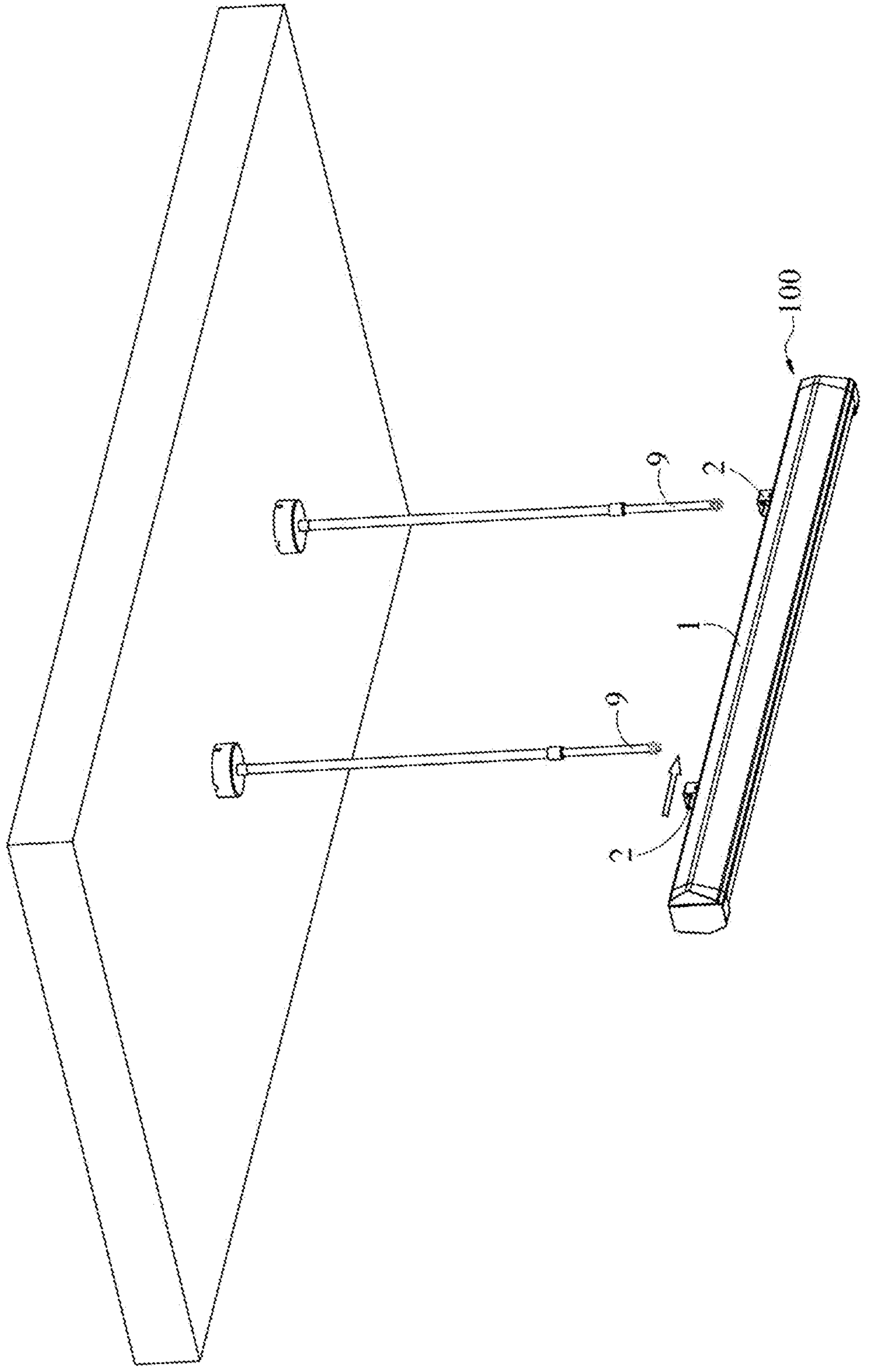
FIG. 1 is an exploded view of a linear light having clamper in accordance with one embodiment of the present invention.
Figure 2:
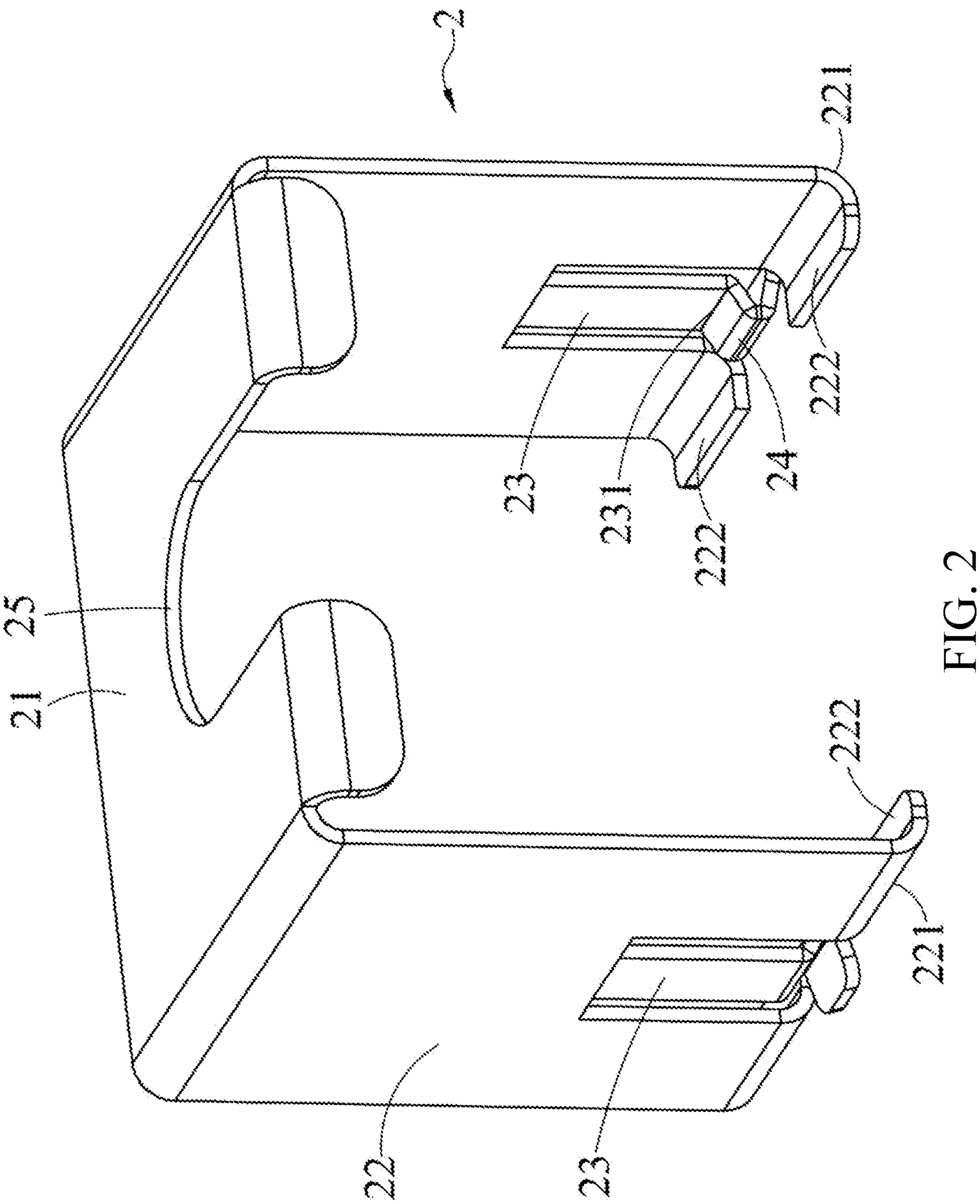
FIG. 2 is a perspective view of a clamper in accordance with one embodiment of the present invention; each of the lateral arms of the clamper is provided with a self-locking element.

Please refer to FIG. 1 and FIG. 2. FIG. 1 is an exploded view of a linear light 100 having a clamper 2 in accordance with one embodiment of the present invention. FIG. 2 is a perspective view of a clamper 2 in accordance with one embodiment of the present invention; each of the lateral arms 22 of the clamper 2 is provided with a self-locking element 23.

In one embodiment, the linear light 100 includes a lamp body 1 and several (two) clampers 2. The clampers 2 are made of a plastic material or a metal material.

In one embodiment, the lamp body 1 includes a long aluminum extruded lamp holder, a lamp cover and a light source, etc. The lamp body 1 has installation grooves 10 and protrusion portions 11. Each of the protrusion portions 11 is disposed adjacent to the opening of the installation groove 10 corresponding thereto. The installation grooves 10 are disposed at the back side of the lamp holder and the lamp cover is installed on the front side of the lamp holder.

In one embodiment, the clamper 2 has a top portion 21 and a plurality of lateral arms 22. The lateral arms 22 are disposed at the two sides of the top portion 22. The first end portion 221 of each lateral arm 22 is provided with load-bearing bending plates 222. Each of the load-bearing bending plates 222 is movably disposed in the installation groove 10 and engaged with the protrusion portion 11 corresponding thereto. The cross-sections of the top portion 21 and the lateral arms 22 are inverted U-shaped.

Figure 14:
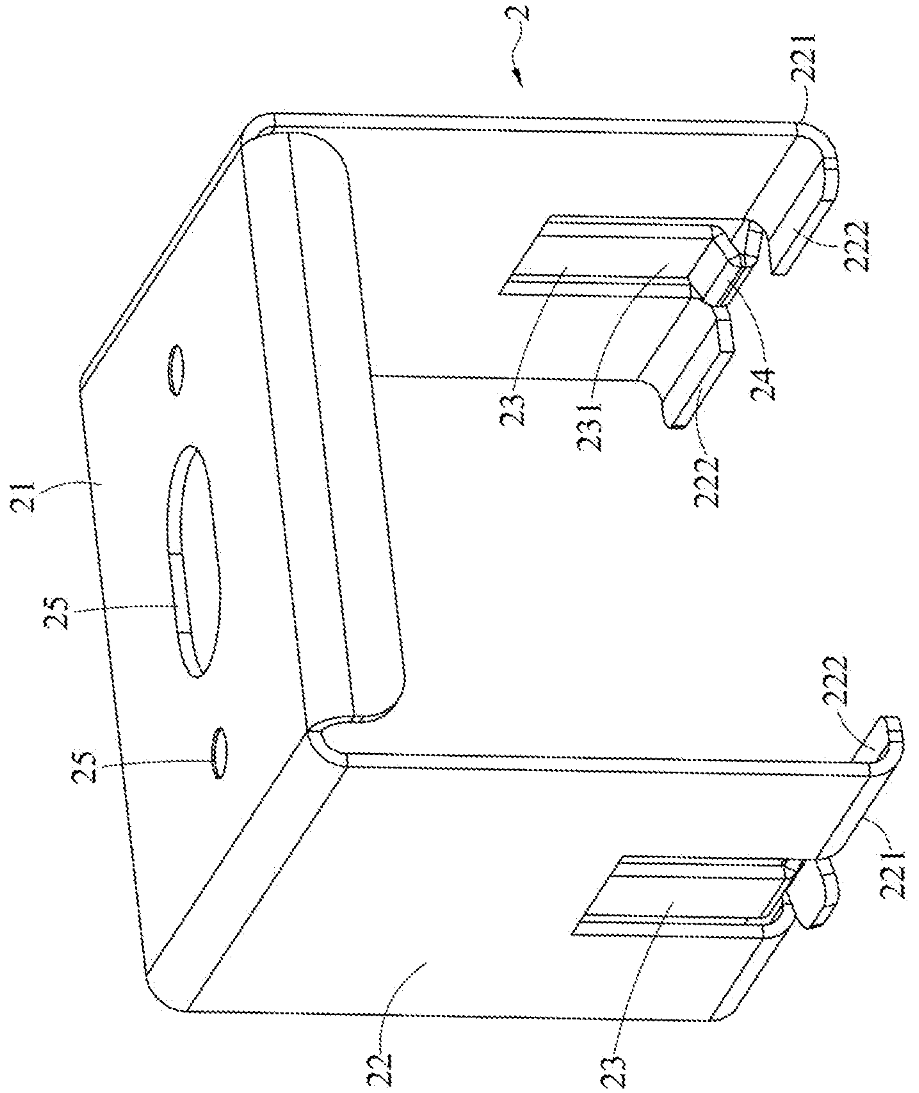
FIG. 14 is a perspective view of the clamper having the installation holes in accordance with still further another embodiment of the present invention.

In one embodiment, the clamper 2 has an installation hole 25 disposed on the top portion 21. The clamper 2 can be connected to a hanger rod 9 via the installation hole 25, such that the linear light 100 can be hanged on the ceiling of a building. The structure of the installation hole 25 may be changed according to the actual requirements. For example, the installation hole 25 may be a groove and a circular hole. The installation hole 25 may include a long circular hole and several small holes, as shown in FIG. 14.

Figure 3:
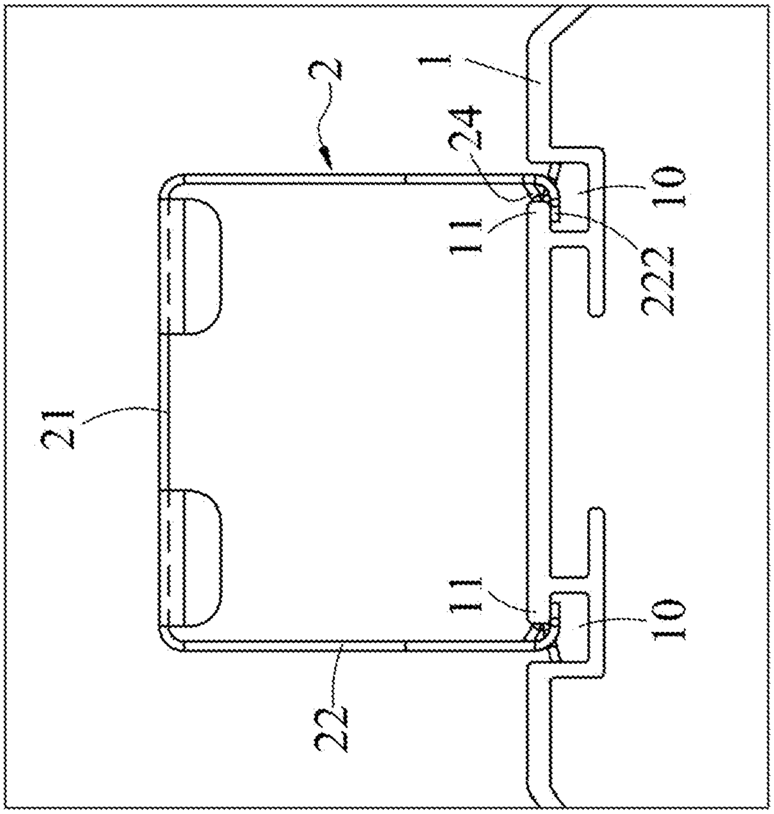
FIG. 3 is a schematic view of the clamper (of FIG. 2) engaged with installation grooves of a lamp body in accordance with one embodiment of the present invention.
Figure 4:
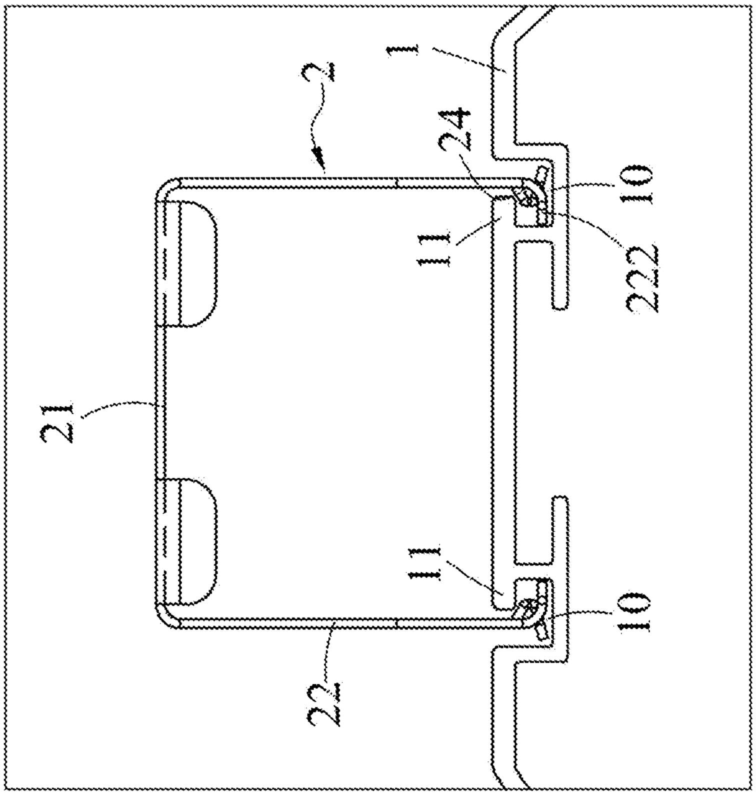
FIG. 4 is a schematic view of the clamper (of FIG. 2) not engaged with the installation grooves of the lamp body in accordance with one embodiment of the present invention.

When the clamper 2 is normally installed on the lamp body 1, the clamper 2 is in a self-locking state (as shown in FIG. 3). The clamper 2 cannot move in relative to the lamp body 1, but the self-locking state can be released via an easy operation. When the self-locking state is released (as shown in FIG. 4), the clamper 2 can easily slide along the lamp body 1. When the operation for releasing the self-locking state stops, the clamper 2 returns to the self-locking state. The clamper 2 can be easily installed on the lamp body 1 and the user can freely adjust the position of the clamper 2 of the linear light 100 via an easy operation. The above structure design can further realize the self-locking function. When the installation of the lamp body 1 is influenced by the position of the installation hole or a barrier (e.g., a cross-beam), the free position adjustment function of the clamper 2 can make the installation of the linear light 100 be easier. In addition, the self-locking function of the clamper 2 can increase the reliability of the linear light 100 after the installation of the linear light 100 is finished.

Figure 12:
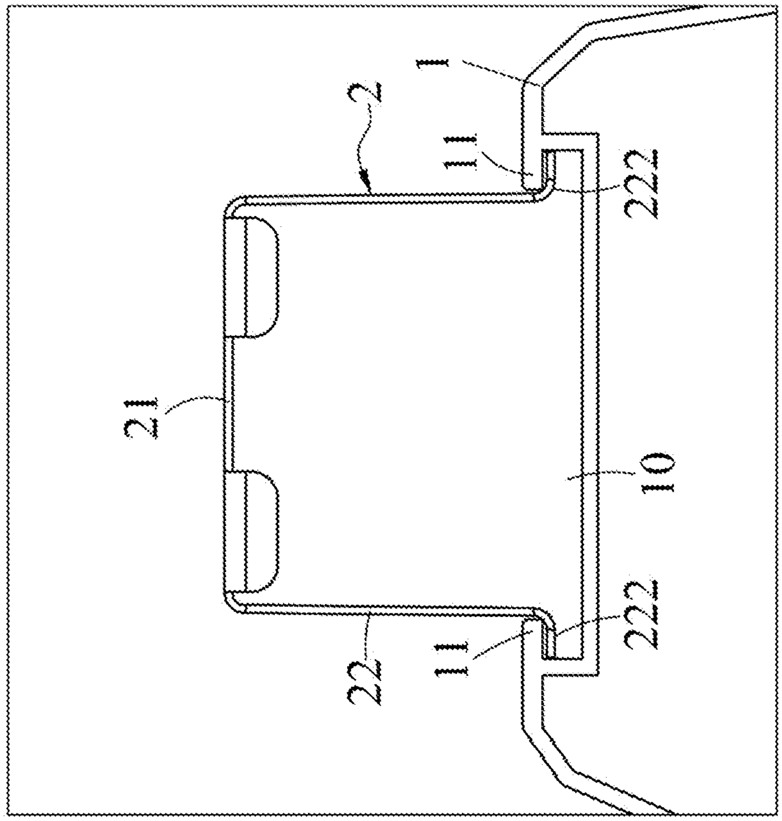
FIG. 12 is a schematic view of the clamper (of FIG. 11) engaged with an installation groove of a lamp body in accordance with still further another embodiment of the present invention.

Please refer to FIG. 2 and FIG. 3. FIG. 3 is a schematic view of the clamper 2 (of FIG. 2) engaged with installation grooves 10 of the lamp body 1 in accordance with one embodiment of the present invention. In one embodiment, the bending direction of one of the load-bearing bending plates 222 faces the bending direction of the load-bearing bending plate 222 corresponding thereto or the bending direction of one of the load-bearing bending plates 222 is opposite to the bending direction of the load-bearing bending plate 222 corresponding thereto. Each of the load-bearing bending plates 222 is a protrusion structure vertical to the lateral arm 22 corresponding thereto. The distance between the protrusion structures is greater than the width of the installation groove 10. In one embodiment, the lamp body 1 has several installation grooves 10 (there may be only one installation groove 10, as shown in FIG. 12).

Please refer to FIG. 2~FIG. 4. FIG. 4 is a schematic view of the clamper 2 (of FIG. 2) not engaged with the installation grooves 10 of the lamp body 1 in accordance with one embodiment of the present invention. In one embodiment, the clamp 2 has a plurality of self-locking elements 23 disposed on the lateral arms 22 respectively. The second end portion 231 of each of the self-locking elements 23 is provided with a self-locking folded portion 24. The height of the self-locking folded portions 24 is different from that of the load-bearing bending plates 222. The locking folded portions 24 are movably engaged with the protrusion portions 11 or disposed in the installation grooves 10. The width of the self-locking folded portion 24 is less than the width of the installation groove 10 corresponding thereto. In one embodiment, the self-locking elements 23 is disposed at the center of the lateral arm 23 corresponding thereto.

Please refer to FIG. 2~FIG. 4. When the clamper 2 is installed on the lamp body 1, the load-bearing bending plates 222 can support the weight of the lamp body 1 and the self-locking folded portions 24 can provide the self-locking function. When the lamp body 1 is hanged on the ceiling of a building via the clampers 2 and the hanger rods 9. Due to the weight of the lamp body 1, the self-locking folded portions 24 are pulled to be close to the openings of the installation grooves 10 and engaged with the protrusion portions 11 respectively. As the width of the self-locking folded portion 24 is greater than the width of the opening, the self-locking folded portion 24 can be engaged with the opening. Then, the clamper 2 can enter the self-locking state. That is to say, the self-locking folded portion 24 of each self-locking element 23 presses against the two sides of the protrusion portion 11 corresponding thereto and the load-bearing bending plates 222 press against the bottoms of the protrusion portions 11 respectively, such that the lamp body 1 and the clamper 2 can be fixed with each other.

Please refer to FIG. 2~FIG. 4. When it is necessary to release the self-locking state of the clamper 2, the user just needs to press the clamper 2 in the direction toward the lamp body 1 in order to separate the self-locking folded portions 24 of the clamper 2 from the protrusion portions 11 adjacent to the openings of the installation grooves 10 of the clamper 2. Thus, the self-locking state of the clamper 2 can be released and then the clamper 2 can freely slide along the installation grooves 10.

Figure 5:
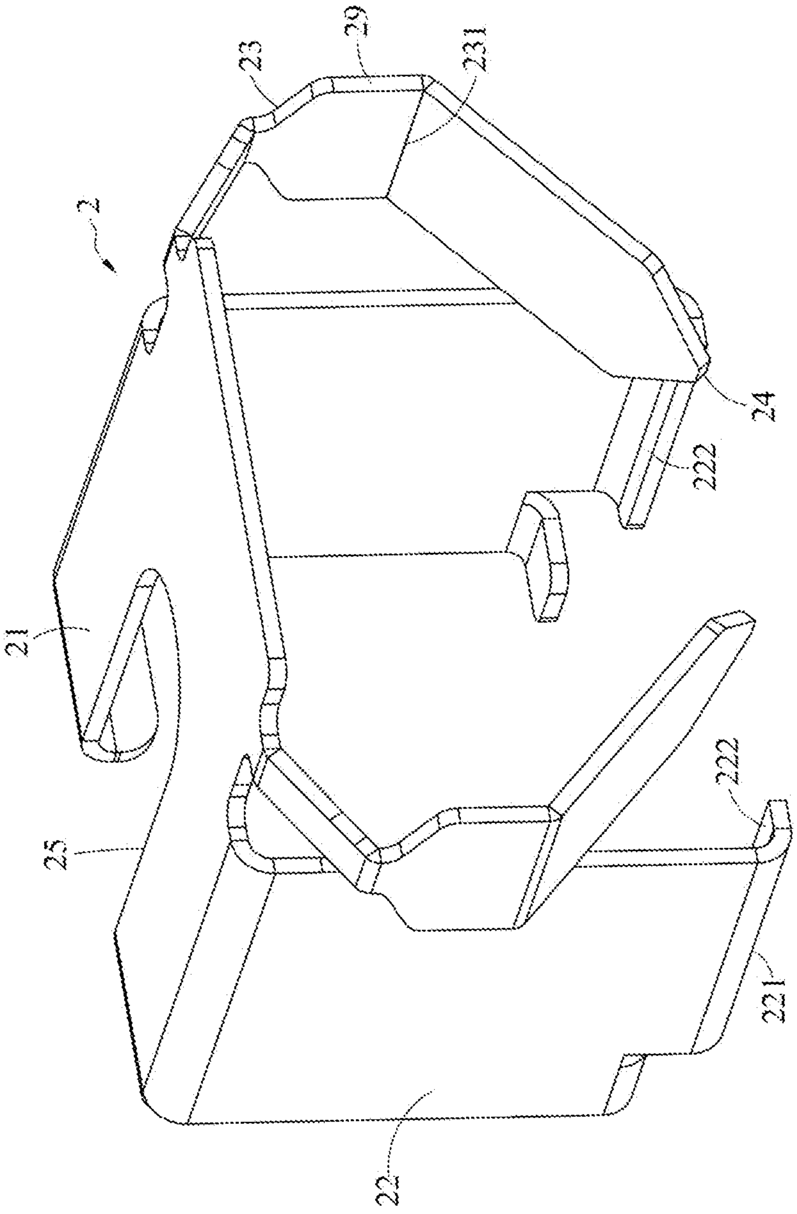
FIG. 5 is a perspective view of a clamper in accordance with another embodiment of the present invention; one side of each of the lateral arms of the clamper is provided with a self-locking element.
Figure 6:
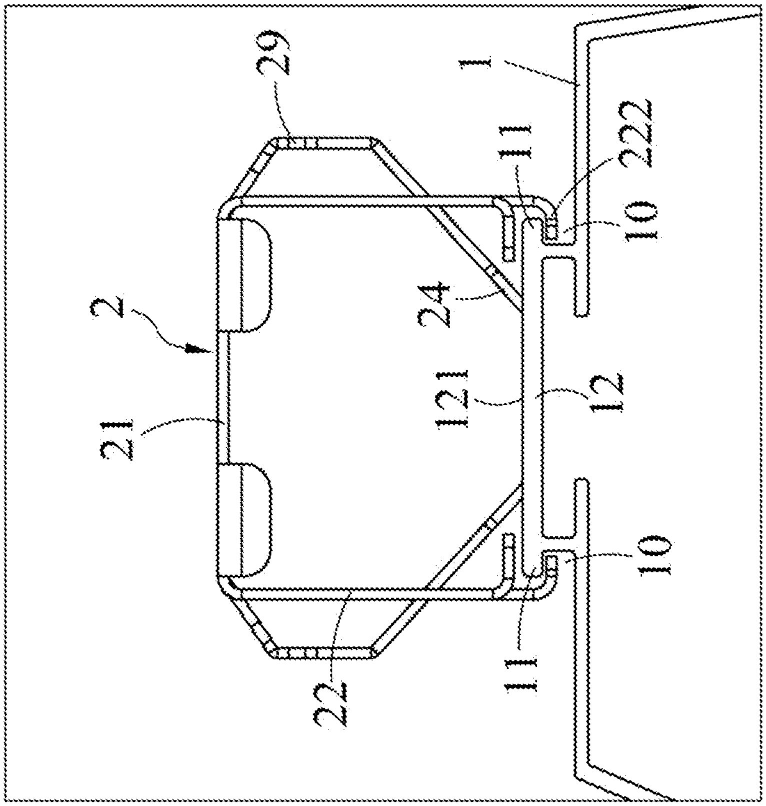
FIG. 6 is a schematic view of the clamper (of FIG. 5) pressing against a lamp body in accordance with one embodiment of the present invention.
Figure 7:
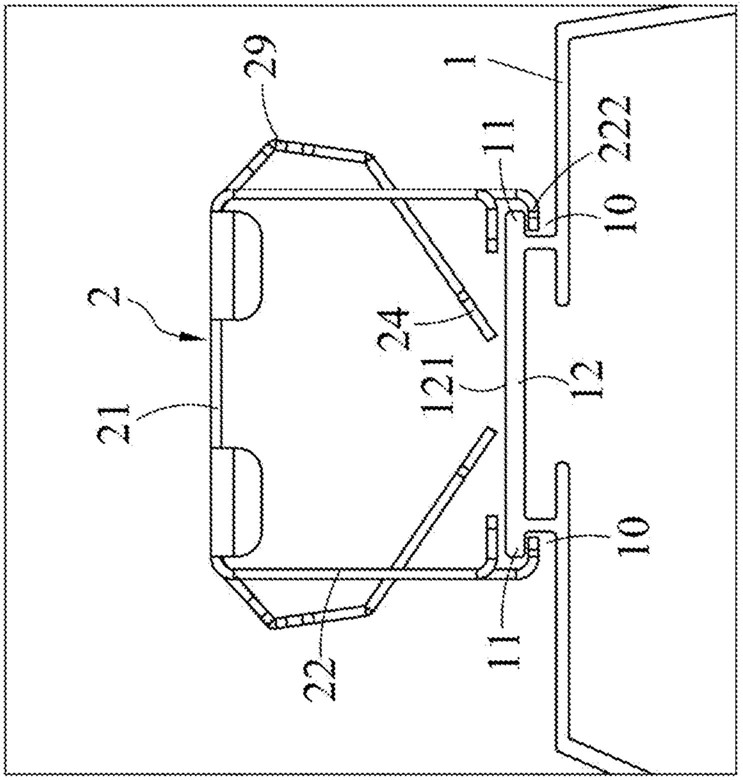
FIG. 7 is a schematic view of the clamper (of FIG. 5) not pressing against the lamp body in accordance with one embodiment of the present invention.

Please refer to FIG. 5~FIG. 7. FIG. 5 is a perspective view of a clamper 2 in accordance with another embodiment of the present invention; one side of each of the lateral arms 22 of the clamper 2 is provided with a self-locking element 23. FIG. 6 is a schematic view of the clamper 2 (of FIG. 5) pressing against a lamp body 1 in accordance with one embodiment of the present invention. FIG. 7 is a schematic view of the clamper 2 (of FIG. 5) not pressing against the lamp body 1 in accordance with one embodiment of the present invention. In one embodiment, a linear light 100 includes a lamp body 1 and several (two) clampers 2. The lamp body 2 has a protrusion stage 12 and installation grooves 10 disposed at the two sides of the protrusion stage 12 respectively. The clamper 2 has a top portion 21, a plurality of lateral arms 22 disposed at two sides of the top portion 21 respectively, and a plurality of self-locking elements 23. The first end portion 221 of each of the lateral arms 22 is provided with a load-bearing bending plate 222 and the load-bearing bending plate 222 is movably disposed in the installation groove 10 corresponding thereto. The self-locking elements 23 are disposed on the lateral arms 22 respectively and the second end portion 231 of each of the self-locking elements 23 is provided with a self-locking folded portion 24 movably engaged with the surface 121 of the protrusion stage 12. In one embodiment, each of the self-locking elements 23 is disposed at one side of the lateral arm 22 corresponding thereto, such that the self-locking element 23 can be a trapezoidal plate having several bending portions. In other words, the cross-section of the self-locking element 23 is trapezoidal.

Please refer to FIG. 5~FIG. 7. In one embodiment, each of the self-locking elements 23 has a pressing portion 29 and the distance between the pressing portions 29 is greater than the distance between the lateral arms 22.

Please refer to FIG. 5~FIG. 7. In one embodiment, the clamper 2 is provided with a plurality of the load-bearing bending plates 222 and a plurality of self-locking folded portions 24. The width of the self-locking folded portion 24 is greater than the width of the lateral arm 22 of the clamper 2. A portion of the self-locking folded portion 24 protrudes from the clamper 22 serves as a pressing portion 29. When the clamper 2 is installed on the lamp body 1, the load-bearing bending plates 222 can support the weight of the lamp body 1 and the self-locking folded portions 24 can provide the self-locking function. When the installation of the lamp body 1 is finished, the self-locking folded portions 24 press against the protrusion stage 12. Meanwhile, one end of each self-locking folded portion 24 presses against the surface 121 of the protrusion stage 12, such that the clamper 2 is in the self-locking state.

Please refer to FIG. 5~FIG. 7. When it is necessary to release the self-locking state of the clamper 2, the user just needs to press the two pressing portions 29. In this way, the two pressing portions 29 move toward the center of the clamper 2, such that the self-locking folded portions 24 of the clamper 2 can be separated from the surface 121 of the protrusion stage 12. Thus, the pressing-against state can be changed to the separated state, such that the self-locking state of the clamper 2 can be released. Then, the clamper 2 can freely slide along the installation grooves 10.

Figure 8:
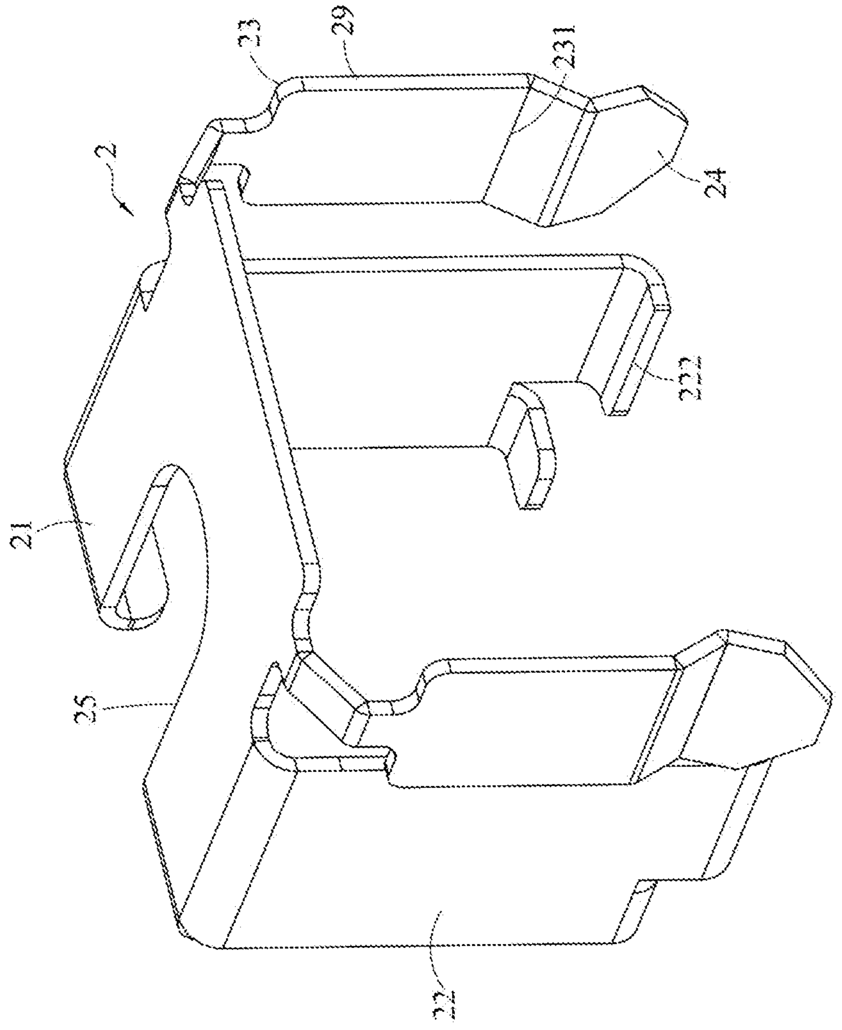
FIG. 8 is a perspective view of a clamper in accordance with still another embodiment of the present invention; each of the lateral arms of the clamper is provided with a self-locking element.
Figure 9:
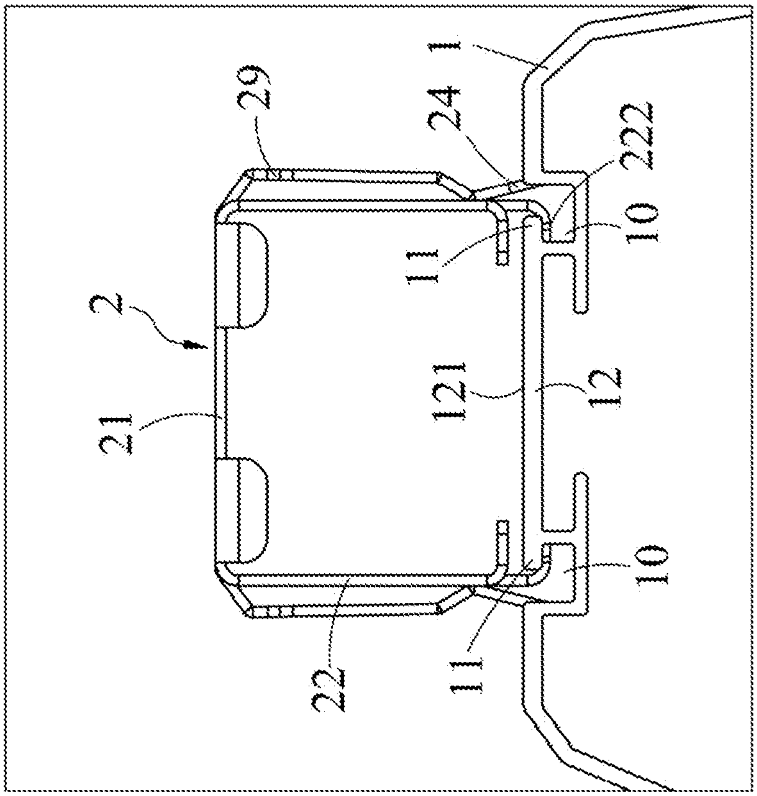
FIG. 9 is a schematic view of the clamper (of FIG. 8) engaged with installation grooves of a lamp body in accordance with still another embodiment of the present invention.
Figure 10:
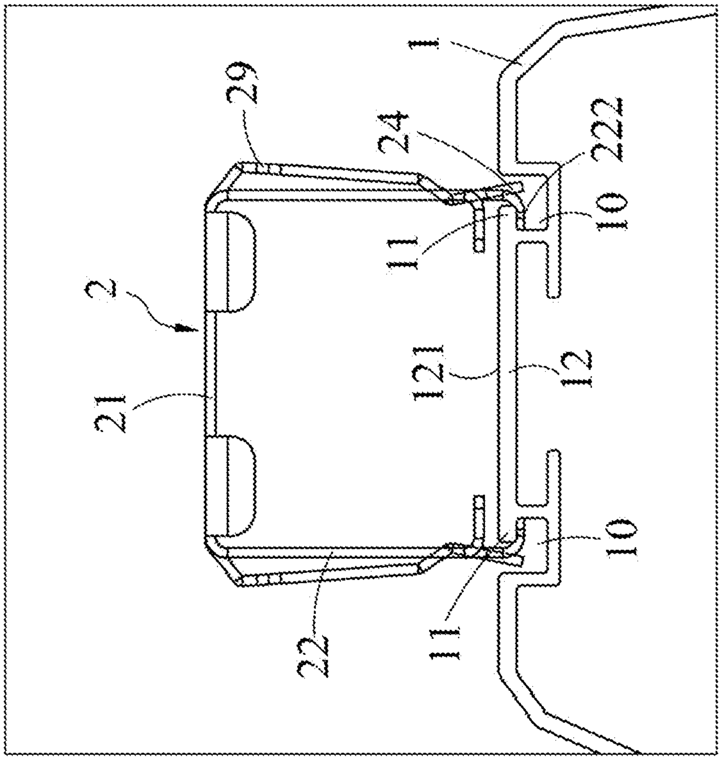
FIG. 10 is a schematic view of the clamper (of FIG. 8) not engaged with the installation grooves of the lamp body in accordance with still another embodiment of the present invention.

Please refer to FIG. 8~FIG. 10. FIG. 8 is a perspective view of a clamper 2 in accordance with still another embodiment of the present invention; each of the lateral arms 22 of the clamper is provided with a self-locking element 23. FIG. 9 is a schematic view of the clamper 2 (of FIG. 8) engaged with installation grooves 10 of a lamp body 1 in accordance with still another embodiment of the present invention. FIG. 10 is a schematic view of the clamper 2 (of FIG. 8) not engaged with the installation grooves 10 of the lamp body 1 in accordance with still another embodiment of the present invention. The linear light 100 includes a lamp body 1 and several (two) clampers 2. The lamp body 1 includes a plurality of installation grooves 10. The clamper 2 has a top portion 21, a plurality of lateral arms 22 disposed at two sides of the top portion 21 respectively, and a plurality of self-locking elements 23. The first end portion 221 of each of the lateral arms 22 is provided with a load-bearing bending plate 222 and the load-bearing bending plate 222 is movably disposed in the installation groove 10 corresponding thereto. The self-locking elements 23 are disposed on the lateral arms 22 respectively and the second end portion 231 of each of the self-locking elements 23 is provided with a self-locking folded portion 24. The self-locking folded portions 24 are movably engaged with the installation grooves 10 respectively.

Please refer to FIG. 8~FIG. 10. In one embodiment, each of the self-locking elements 23 has a pressing portion 29 and the distance between the pressing portions 29 is greater than the distance between the lateral arms 22.

Please refer to FIG. 8~FIG. 10. In one embodiment, the clamper 2 is provided with a plurality of the load-bearing bending plates 222 and a plurality of self-locking folded portions 24. The width of the self-locking folded portion 24 is greater than the width of the lateral arm 22 of the clamper 2. A portion of the self-locking folded portion 24 protrudes from the clamper 22 serves as a pressing portion 29. When the clamper 2 is installed on the lamp body 1, the load-bearing bending plates 222 can support the weight of the lamp body 1 and the self-locking folded portions 24 can provide the self-locking function. When the installation of the lamp body 1 is finished, the self-locking folded portions 24 press against the protrusion stage 12. Meanwhile, one end of each self-locking folded portion 24 presses against the surface 121 of the protrusion stage 12, such that the clamper 2 is in the self-locking state.

Please refer to FIG. 8~FIG. 10. When it is necessary to release the self-locking state of the clamper 2, the user just needs to press the two pressing portions 29. In this way, the two pressing portions 29 move toward the center of the clamper 2, such that the self-locking folded portions 24 of the clamper 2 can be separated from the inner wall of the installation groove 10 corresponding thereto. Thus, the pressing-against state can be changed to the separated state, such that the self-locking state of the clamper 2 can be released. Then, the clamper 2 can freely slide along the installation grooves 10.

Figure 11:
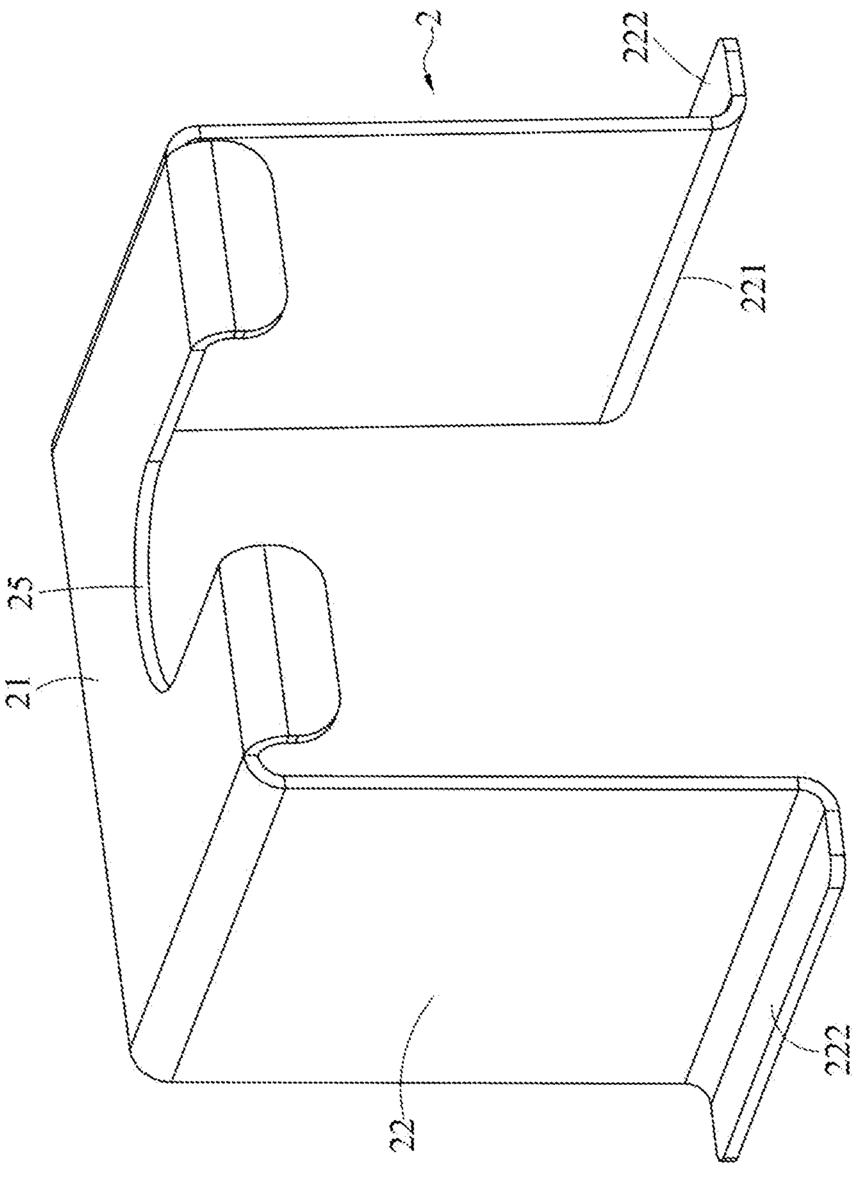
FIG. 11 is a perspective view of a clamper in accordance with still further another embodiment of the present invention; each of the lateral arms of the clamper is provided with a load-bearing bending plate.
Figure 13:
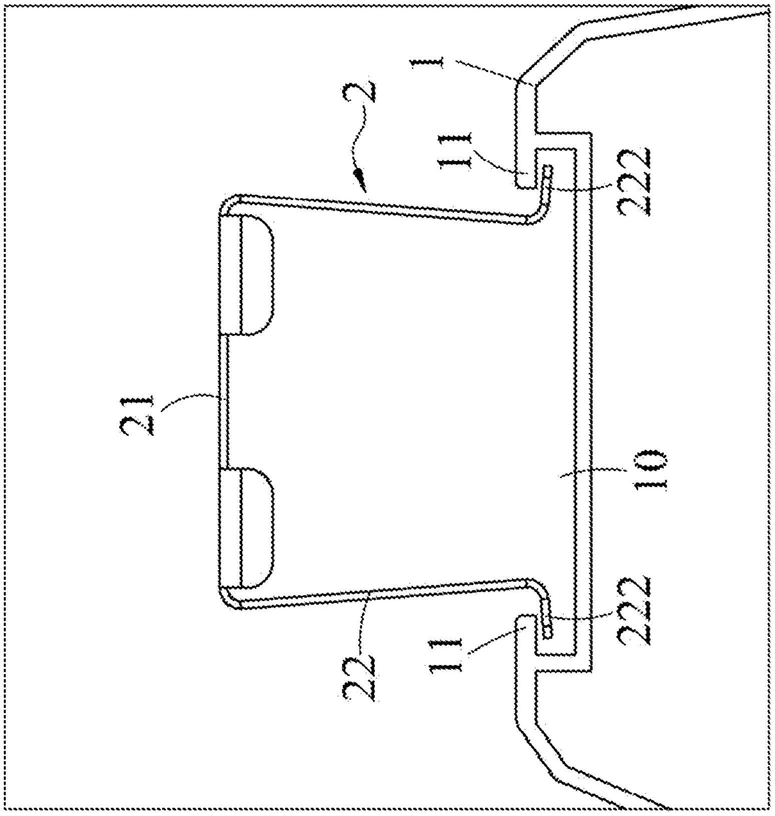
FIG. 13 is a schematic view of the clamper (of FIG. 11) not engaged with the installation groove of the lamp body in accordance with still further another embodiment of the present invention.

Please refer to FIG. 11~FIG. 13. FIG. 11 is a perspective view of a clamper 2 in accordance with still further another embodiment of the present invention; each of the lateral arms 22 of the clamper 2 is provided with a load-bearing bending plate 222. FIG. 12 is a schematic view of the clamper 2 (of FIG. 11) engaged with an installation groove 10 of a lamp body 1 in accordance with still further another embodiment of the present invention. FIG. 13 is a schematic view of the clamper 2 (of FIG. 11) not engaged with the installation groove 10 of the lamp body 1 in accordance with still further another embodiment of the present invention. In one embodiment, the clamper 2 is provided with a plurality of load-bearing bending plates 222. The bending direction of one of the load-bearing bending plates 222 faces the bending direction of the load-bearing bending plate 222 corresponding thereto or the bending direction of one of the load-bearing bending plates 222 is opposite to the bending direction of the load-bearing bending plate 222 corresponding thereto. The distance between the two load-bearing bending plates 222 is greater than the distance between the two sides of the installation groove 10. When the user installs the clampers 2 on the lamp body 1, the state between the load-bearing bending plates 222 and the two sides of the installation groove 10 is interference fit. Therefore, the above structure can provide not only weight supporting function, but also the self-locking function.

Please refer to FIG. 11~FIG. 13. When it is necessary to release the self-locking state of the clamper 2, the user just needs to press the two lateral arms 22 in the direction toward the center of the clamper 2 in order to separate the self-locking folded portions 24 of the clamper 2 from the inner walls of the installation groove 10. Thus, the pressing-against state can be changed to the separated state, such that the self-locking state of the clamper 2 can be released. Then, the clamper 2 can freely slide along the installation groove 10.

To sum up, according to the linear light of one embodiment of the present invention, the clamper can be easily installed on the linear light and the user can easily and freely to move the clamper in order to adjust the position of the clamper and realize the self-locking function. When the installation of the linear light is influenced by the installation hole or a barrier (e.g., a crossbeam), the free position adjustment function of the clamper can make the installation of the linear light be easier. In addition, the self-locking function of the clamper can increase the reliability of the linear light after the installation of the linear light is finished.

It will be apparent to those skilled in the art that various modifications and variations can be made to the disclosed embodiments. It is intended that the specification and examples be considered as exemplary only, with a true scope of the present invention being indicated by the following claims and their equivalents.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A linear light, comprising:

a lamp body having an installation groove and a protrusion portion disposed adjacent to the installation groove; and a clamper having a top portion and a plurality of lateral arms disposed at two sides of the top portion respectively, wherein a first end portion of each of the lateral arms is provided with a load-bearing bending plate and the load-bearing bending plates are movably disposed in the installation groove and engaged with the protrusion portion, wherein the clamper has a plurality of self-locking elements disposed on the lateral arms respectively, wherein each of the self-locking elements has a pressing portion and a self-locking folded portion connected to each other to form a bending arm, and the self-locking folded portion is located at a second end portion of each of the self-locking elements, wherein the self-locking folded portions press against the protrusion portion, whereby the self-locking folded portions are movably engaged with the protrusion portion.

2. The linear light as claimed in claim 1, wherein a bending direction of one of the load-bearing bending plates faces a bending direction of another of the load-bearing bending plates or the bending direction of one of the load-bearing bending plates is opposite to the bending direction of another of the load-bearing bending plates, wherein each of the load-bearing bending plates is a protrusion structure vertical to the lateral arm corresponding thereto.

3. The linear light as claimed in claim 2, wherein a distance between the protrusion structures is greater than a width of the installation groove.

4. The linear light as claimed in claim 1, wherein the clamper is made of a plastic material or a metal material.

5. The linear light as claimed in claim 1, wherein the clamper has an installation hole disposed on the top portion thereof.

6. A linear light, comprising:

a lamp body having a protrusion stage and installation grooves disposed at two sides of the protrusion stage respectively; and a clamper having a top portion, a plurality of lateral arms disposed at two sides of the top portion respectively, and a plurality of self-locking elements, wherein a first end portion of each of the lateral arms is provided with a load-bearing bending plate and the load-bearing bending plates are movably disposed in the installation grooves respectively, wherein the self-locking elements are disposed on the lateral arms respectively, wherein each of the self-locking elements has a pressing portion and a self-locking folded portion connected to each other to form a bending arm, and the self-locking folded portion is located at a second end portion of each of the self-locking elements, wherein the self-locking folded portions press against a surface of the protrusion stage, whereby the self-locking folded portions are movably engaged with the surface of the protrusion stage.

7. The linear light as claimed in claim 6, wherein a distance between the pressing portions is greater than a distance between the lateral arms.

8. A linear light, comprising:

a lamp body having a plurality of installation grooves; and a clamper having a top portion, a plurality of lateral arms disposed at two sides of the top portion respectively, and a plurality of self-locking elements, wherein a first end portion of each of the lateral arms is provided with a load-bearing bending plate and the load-bearing bending plate is movably disposed in the installation groove, wherein the self-locking elements are disposed on the lateral arms respectively, wherein each of the self-locking elements has a pressing portion and a self-locking folded portion connected to each other to form a bending arm, and the self-locking folded portion is located at a second end portion of each of the self-locking elements, wherein the self-locking folded portions press against the installation grooves respectively, whereby the self-locking folded portions are movably engaged with the installation grooves respectively.

9. The linear light as claimed in claim 8, wherein a distance between the pressing portions is greater than a distance between the lateral arms.

* * * * *